US012353148B2

(12) United States Patent
Hashimura

(10) Patent No.: US 12,353,148 B2
(45) Date of Patent: Jul. 8, 2025

(54) IMAGE FORMING APPARATUS

(71) Applicant: CANON KABUSHIKI KAISHA, Tokyo (JP)

(72) Inventor: Naonari Hashimura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/603,464

(22) Filed: Mar. 13, 2024

(65) Prior Publication Data

US 2024/0345510 A1 Oct. 17, 2024

(30) Foreign Application Priority Data

Apr. 14, 2023 (JP) ................................ 2023-066246

(51) Int. Cl.
*G03G 15/09* (2006.01)
*G03G 15/08* (2006.01)

(52) U.S. Cl.
CPC ..... *G03G 15/0907* (2013.01); *G03G 15/0891* (2013.01); *G03G 15/0935* (2013.01)

(58) Field of Classification Search
CPC ........... G03G 15/0921; G03G 15/0808; G03G 15/0812
See application file for complete search history.

(56) References Cited

U.S. PATENT DOCUMENTS

| | | | | |
|---|---|---|---|---|
| 11,480,893 B2 | 10/2022 | Takeuchi et al. | | |
| 2017/0269508 A1* | 9/2017 | Shimizu | ............. | G03G 15/0907 |
| 2018/0011419 A1* | 1/2018 | Kamiyama | ........ | G03G 15/0812 |
| 2022/0253004 A1* | 8/2022 | Takeuchi | ........... | G03G 15/0907 |

FOREIGN PATENT DOCUMENTS

| | | | | |
|---|---|---|---|---|
| CN | 114924471 A * | 8/2022 | ........... | G03G 15/065 |
| JP | 2008-197489 A | 8/2008 | | |
| JP | 2011-002619 A | 1/2011 | | |
| JP | 2011-085777 A | 4/2011 | | |
| JP | 2017-021278 A | 1/2017 | | |
| JP | 2022-120470 A | 8/2022 | | |

OTHER PUBLICATIONS

English Translation of CN-114924471-A (Year: 2022).*

* cited by examiner

*Primary Examiner* — Jessica L Eley
(74) *Attorney, Agent, or Firm* — VENABLE LLP

(57) ABSTRACT

An image forming apparatus includes a developing device including a developing roller, a supply roller, and a conductive roller. During image formation, a bias is applied to each of the supplying roller, the developing roller, and the conductive roller in a state in which each of the supplying roller, the developing roller, and the conductive roller is rotationally driven. During the image formation, a polarity of a first potential obtained by subtracting a DC potential of the developing roller from a DC potential of the supplying roller is the same as a normal charge polarity of the toner, and a polarity of a second potential obtained by subtracting the DC potential of the developing roller from a DC potential of the conductive roller is the same as the normal charge polarity of the toner.

13 Claims, 9 Drawing Sheets

IMAGE FORMING APPARATUS

FIELD OF THE INVENTION AND RELATED ART

The present invention relates to an image forming apparatus including a developing device.

In the developing device, conventionally, one using a two-component developer containing toner comprising non-magnetic particles and a carrier comprising magnetic particles (hereinafter, the two-component developer is simply referred to as the developer) has been known. As such a developing device, a constitution using a so-called hybrid developing type including a developing roller as a rotatable developing member provided opposed to a photosensitive drum as an image bearing member and including a supplying roller as a rotatable supplying member provided opposed to the developing roller has been proposed (Japanese Laid-Open Patent Application (JP-A) 2017-21278).

In the case of the developing device disclosed in JP-A 2017-21278, a first toner shielding member is provided on a side downstream, with respect to a rotational direction, of a closest position between the developing roller and the supplying roller and in a space between a wall portion of a developing container and the developing roller. By this, scattering of toner, floating in the neighborhood of this space, to an outside of the developing device is suppressed. Further, in the case of the developing device disclosed in JP-A 2017-21278, in addition to the first toner shielding member, a second toner shielding member is provided between the wall portion and the first toner shielding member.

However, in the case of the developing device disclosed in JP-A 2017-21278, there is a possibility that a pressure inside the developing device increases, and thus the above-described floating toner in the neighborhood of the space scatters to a gap between the first toner shielding member and the developing roller or from a gap between the developing roller and the supplying roller to an outside of the developing device.

SUMMARY OF THE INVENTION

A principal object of the present invention is to provide an image forming apparatus capable of suppressing scattering of toner.

According to an aspect of the present invention, there is provided an image forming apparatus comprising: an image bearing member; a developing device including: a developing container configured to accommodate a developer containing toner and a carrier, a developing roller configured to carry and convey the toner to a developing position where an electrostatic latent image formed on the image bearing member is developed with the toner, a supplying roller provided opposed to the developing roller and configured to supply only the toner to the developing roller while carrying and conveying the developer supplied from the developing container, the developing roller being rotated in a rotational direction opposite to a rotational direction of the supplying roller in a closest position where the supplying roller is positioned closest to the developing roller, a first magnet provided non-rotationally and fixedly inside the developing roller and including a first magnetic pole, and a second magnet provided non-rotationally and fixedly inside the supplying roller and including a second magnetic pole which is provided opposed to the first magnetic pole and which is different in polarity from the first magnetic pole; a conductive roller arranged facing the supplying roller and the developing roller, downstream of the developing position and upstream of the closest position in the rotational direction of the developing roller, a shortest distance between the conductive roller and the developing roller being shorter than a shortest distance between the conductive roller and the supplying roller; a driving source configured to drive each of the supplying roller, the developing roller, and the conductive roller; and a bias applying portion configured to apply a bias to each of the supplying roller, the developing roller, and the conductive roller, wherein during image formation, the bias is applied to each of the supplying roller, the developing roller, and the conductive roller in a state in which each of the supplying roller, the developing roller, and the conductive roller is rotationally driven, and wherein during the image formation, a polarity of a first potential obtained by subtracting a DC potential of the developing roller from a DC potential of the supplying roller is the same as a normal charge polarity of the toner, and a polarity of a second potential obtained by subtracting the DC potential of the developing roller from a DC potential of the conductive roller is the same as the normal charge polarity of the toner.

Further features of the present invention will become apparent from the following description of exemplary embodiments with reference to the attached drawings.

Figure 8:
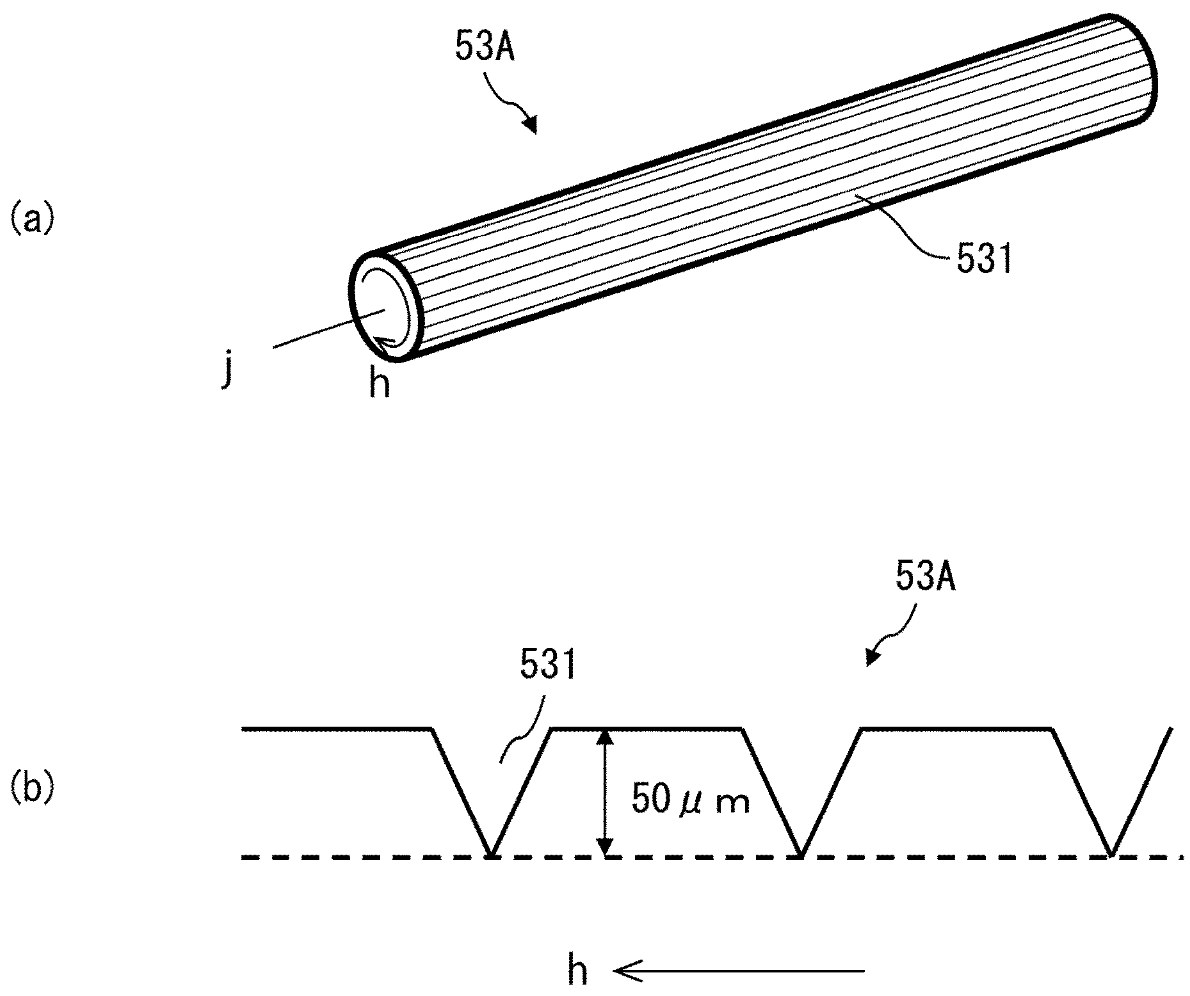

Part (a) of FIG. 8 is a perspective view of a shielding roller according to a third embodiment, and part (b) of FIG. 8 is a schematic enlarged view of a groove portion of the shielding roller according to the third embodiment.

Figure 9:
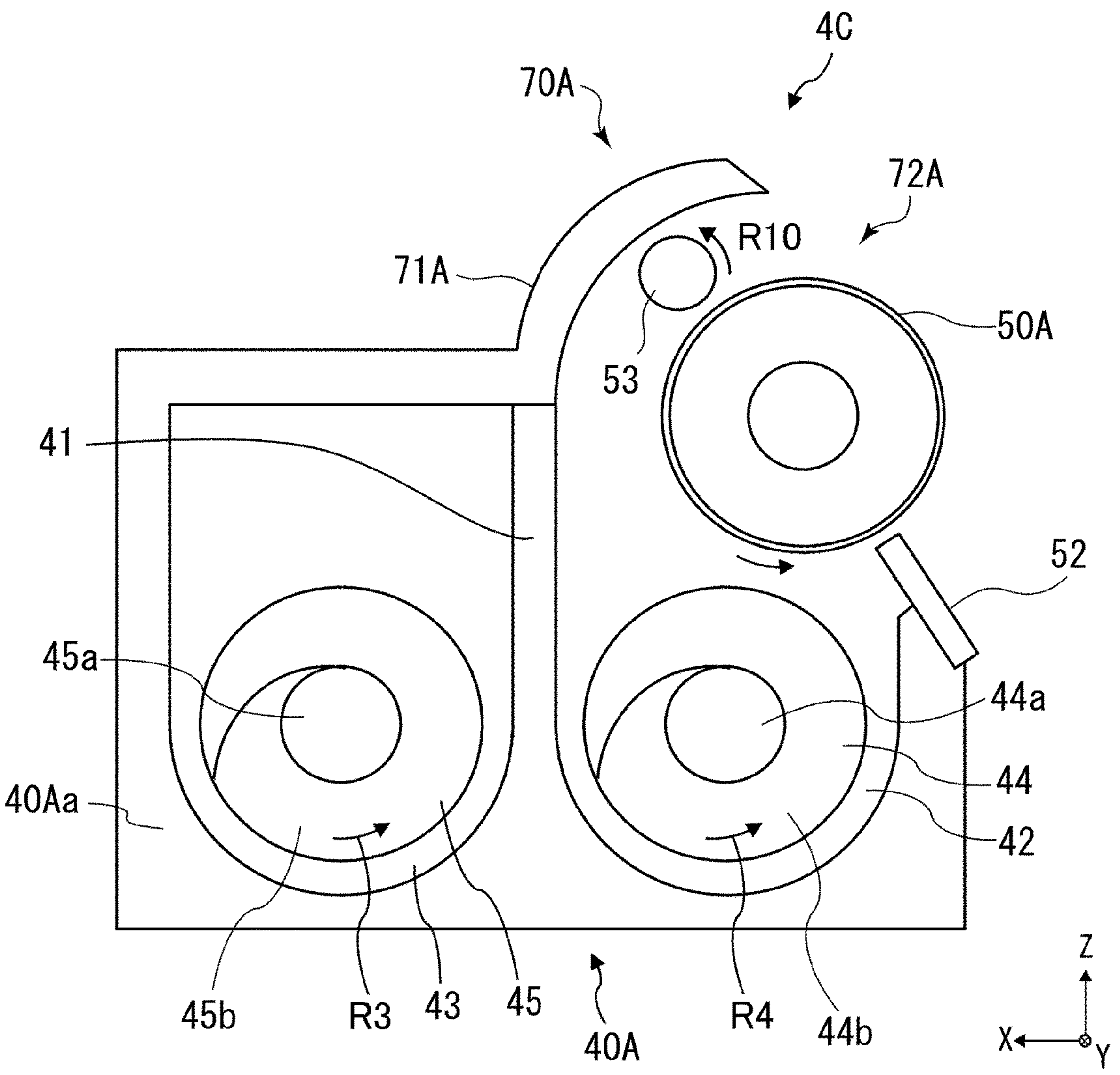

FIG. 9 is a schematic structural sectional view of a developing device according to a fifth embodiment.

DESCRIPTION OF THE EMBODIMENTS

First Embodiment

A first embodiment will be described using FIGS. 1 to 5. Incidentally, in this embodiment, the case where a developing device is applied to a full-color printer of a tandem type as an example of an image forming apparatus is described.

[Image Forming Apparatus]

First, a schematic structure of an image forming apparatus 100 will be described using FIG. 1.

Figure 1:
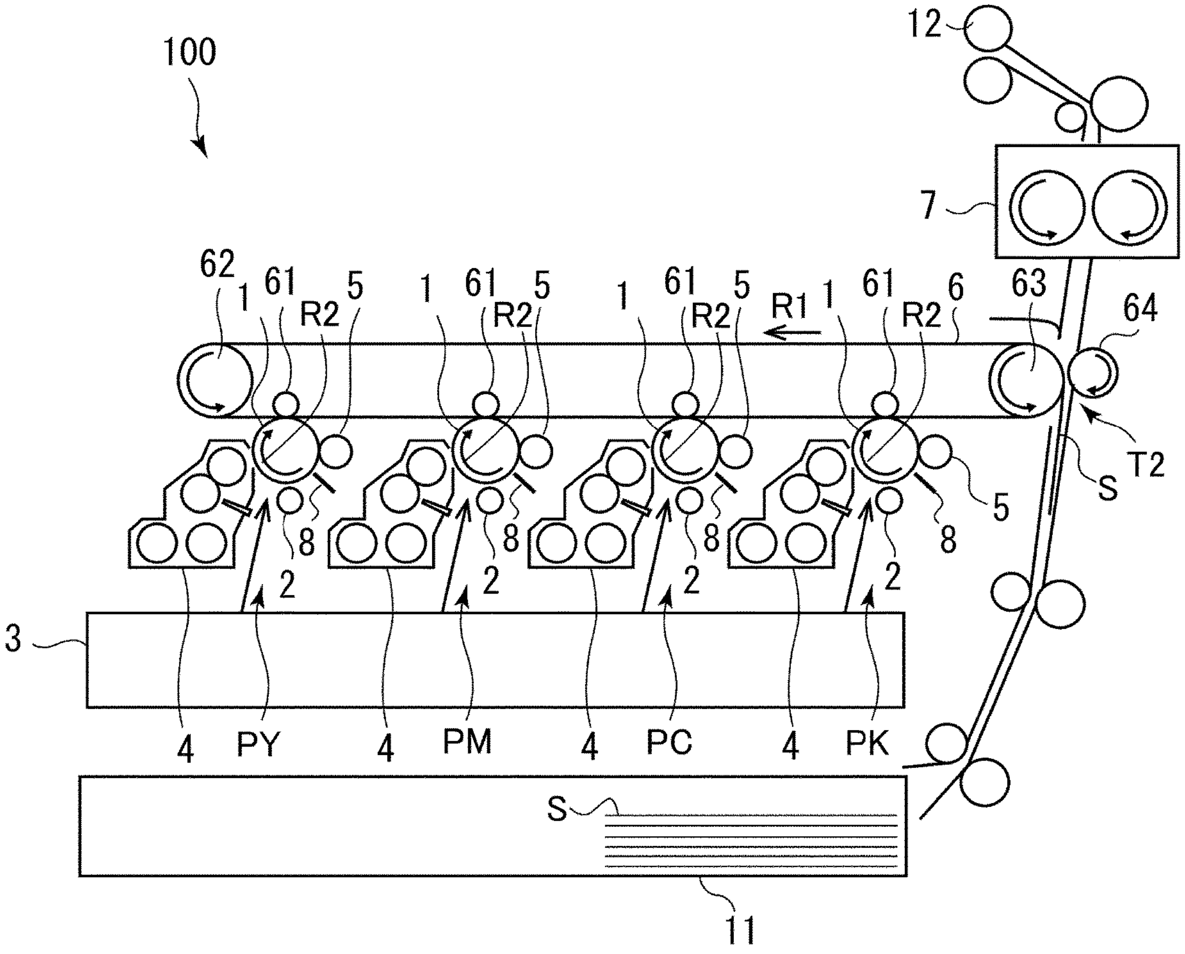
FIG. 1 is a schematic structural sectional view of an image forming apparatus according to a first embodiment.

The image forming apparatus 100 shown in FIG. 1 is a full-color printer of an electrophotographic type including image forming portions PY, PM, PC and PK for four colors (yellow, magenta, cyan and black, respectively) in an apparatus main assembly. In this embodiment, an intermediary transfer tandem type in which the image forming portions PY, PM, PC, and PK are disposed along a rotational direction of an intermediary transfer belt 6 described later is employed. The image forming apparatus 100 forms a toner image (image) on a recording material S depending on an image signal from a host device such as a personal computer connected communicatably to the apparatus main assembly or to an unshown original reading device connected to the apparatus main assembly. As the recording material S, it is possible to cite a sheet material such as a sheet, a plastic film, or a cloth.

A toner image forming process will be described. First, the image forming portions PY, PM, PC and PK will be described. The image forming portions PY, PM, PC and PK are constituted substantially the same except that colors of toners are different from each other so as to be yellow, magenta, cyan and black, respectively. Therefore, in the following, the image forming portion PY for yellow will be described as an example, and other image forming portions PM, PC and PK will be omitted from description.

The image forming portion PY is constituted principally by the photosensitive drum 1, a charging device 2, a developing device 4, a discharging device 5, a cleaning device 8, and the like. In this embodiment, the intermediary transfer belt 6 is provided above the image forming portions PY, PM, PC and PK, and an exposure device 3 is provided below the image forming portions PY, PM, PC and PK. The photosensitive drum 1 as an image bearing member and a photosensitive member includes a photosensitive layer formed on an outer peripheral surface of an aluminum cylinder so as to have a negative charge polarity or a positive charge polarity, and is rotated at a predetermined process speed (peripheral speed) in an arrow R2 direction in embodiment 1.

The charging device 2 electrically charges the surface of the photosensitive drum 1 to, e.g., a uniform negative or positive dark-portion potential depending on a charging characteristic of the photosensitive drum 1. In this embodiment, the charging device 2 is a charging roller rotatable in contact with the surface of the photosensitive drum 1. After the charging, at the surface of the photosensitive drum 1, an electrostatic latent image (electrostatic image) is formed on the basis of image information by the exposure device (laser scanner) 3. The photosensitive drum 1 carries the formed electrostatic latent image and is circulated and moved, and the electrostatic latent image is developed with the toner by the developing device 4. Details of a structure of the developing device 4 will be described later. The toner in the developer consumed by image formation is supplied together with a carrier from an unshown toner cartridge.

The toner image developed from the electrostatic latent image is supplied with a predetermined pressing force and a primary transfer bias by a primary transfer roller 61 provided opposed to the photosensitive drum 1 through the intermediary transfer belt 6, and is primary-transferred onto the intermediary transfer belt 6. The surface of the photosensitive drum 1 after the primary transfer is discharged by the discharging device 5. The cleaning device 8 removes residual matter such as transfer residual toner remaining on the surface of the photosensitive drum 1 after the primary transfer.

The intermediary transfer belt 6 is stretched by a stretching roller 62 and an inner secondary transfer roller 63. The intermediary transfer belt 6 is driven so as to be moved in an arrow R1 direction in FIG. 1 by the inner secondary transfer roller 63 which is also a driving roller. The image forming processes for the respective colors performed by the above-described image forming portions PY, PM, PC and PK are carried out at timings each when an associated color toner image is superposed on the upstream color toner image primary-transferred on the intermediary transfer belt 6 with respect to a movement direction of the intermediary transfer belt 6. As a result, finally, a full-color toner image is formed on the intermediary transfer belt 6 and is conveyed toward a secondary transfer portion T2. The secondary transfer portion T2 is a transfer nip formed by an outer secondary transfer roller 64 and a portion of the intermediary transfer belt 6 stretched by the inner secondary transfer roller 63. Incidentally, the transfer residual toner after passing through the secondary transfer portion T2 is removed from the surface of the intermediary transfer belt 6 by an unshown belt cleaning device.

Relative to the toner image forming process of the toner image sent to the secondary transfer portion T2, at a similar timing, a conveying (feeding) process of the recording material S to the secondary transfer portion T2 is executed. In this conveying process, the recording material S is fed from a sheet cassette 11 and is sent to the secondary transfer portion T2 in synchronism with the image forming timing. In the secondary transfer portion T2, a secondary transfer voltage is applied to the inner secondary transfer roller 63.

By the image forming process and the conveying process which are described above, in the secondary transfer portion T2, the toner image is secondary-transferred from the intermediary transfer belt 6 onto the recording material S. Thereafter, the recording material S is conveyed to a fixing device 7, and is heated and pressed by the fixing device 7, so that the toner image is melted and fixed on the recording material S. Thus, the recording material S on which the toner image is fixed is discharged on an unshown discharge tray by a discharging roller 12.

[Two-Component Developer]

Next, the developer used in this embodiment will be described. In this embodiment, as the developer, a two-component developer which contains non-magnetic toner particles (toner) and magnetic carrier particles (carrier) and which has a mixing coating ratio, of the toner to the carrier, of 8.0 weight % is used. The toner is colored resin particles containing a binder resin, a colorant, and other additives as desired, and onto a surface thereof, an external additive such as colloidal silica fine powder is externally added. The toner is, for example, a negatively chargeable or positively chargeable polyester resin material depending on a charging characteristic of the photosensitive drum 1 and is about 7.0 μm in volume-average particle size. The carrier comprises, for example, magnetic metal particles of, for example, iron, nickel, cobalt or the like, of which surface is oxidized, and is about 40 μm or more and about 50 μm or less in volume average particle size.

In this embodiment, as the developer, a developer including a carrier which has a weight-average particle size of 45 μm, which comprises Mn—Mg as a main component, and which has saturation magnetization of 60 emu/g as a value acquired by MSV method was used. As the toner, toner particles with an intermediate diameter of 7 μm in a volume distribution measured by a Coulter counter were used. Further, a mixture of the toner and the carrier in which a toner concentration is 12% was used as the developer. The charge polarity of the toner is the positive polarity.

[Developing Device]

Figure 2:
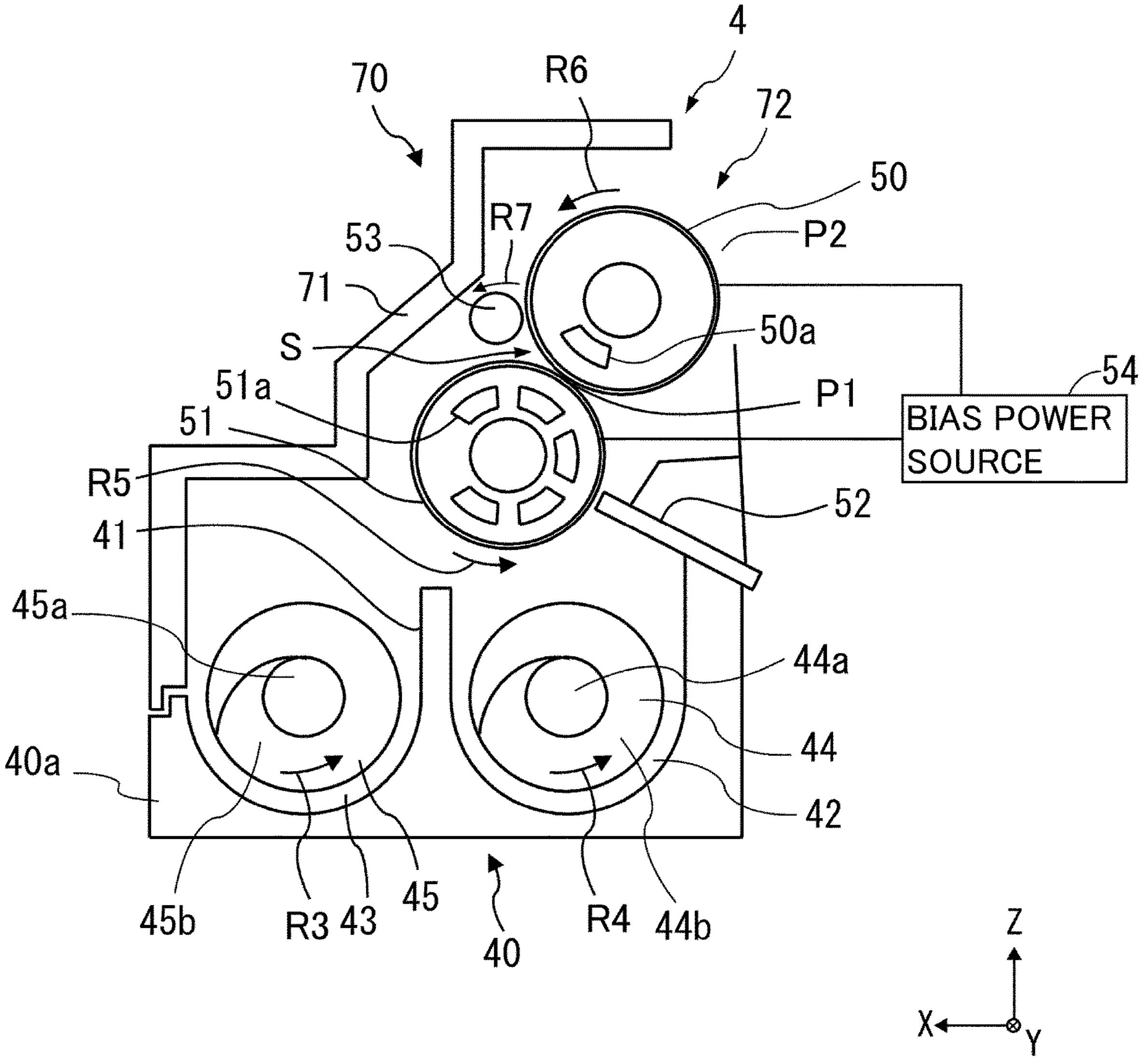
FIG. 2 is a schematic structural sectional view of a developing device according to the first embodiment.

Next, the developing device 4 will be specifically described using FIG. 2. The developing device 4 in this embodiment is a developing device of a so-called touch-down developing type in which a thin layer of only the toner is formed on the developing roller 50 with a magnetic brush by the two-component developer formed on the supplying roller 51 and then development is carried out by causing the toner to fly onto the electrostatic latent image formed on the photosensitive drum 1 by a developing bias, obtained by superimposing a DC and an AC, which is applied to the developing roller 50.

As shown in FIG. 2, the developing device 4 includes the developing container 40, the developing roller 50 as the rotatable developing member, the supplying roller 51 as the rotatable supplying member, and a shielding roller 53 as a rotatable member.

The developing container 40 includes a housing 70, a developer accommodating portion 40*a* provided below the housing 70. The housing 70 includes a wall portion 71 and an opening 72. The wall portion 71 is provided in a position opposing a part of the supplying roller 51. In the case of this embodiment, the wall portion 71 is positioned on a side opposite from a regulating blade 52 described later while sandwiching the supplying roller 51 therebetween. In this position, the wall portion 71 is disposed so as to extend along an outer peripheral surface of the supplying roller 51. The opening 72 is formed in a position where the developing container 40 opposes the photosensitive drum 1, so that the developing roller 50 opposes the photosensitive drum 1 through the opening 72.

In the developer accommodating portion 40*a*, the developer containing the non-magnetic toner and the magnetic carrier is accommodated. The developer accommodating portion 40*a* includes a developing chamber 42 as a first chamber, a stirring chamber 43 as a second chamber, and a partition wall 41 as a partitioning wall. The stirring chamber 43 is disposed adjacent to the developing chamber 42 so as to overlap at least partially with the developing chamber 42 as viewed in a horizontal direction. The partition wall 41 partitions between the developing chamber 42 and the stirring chamber 43. The partition wall 41 is provided with an opening as a communicating portion for establishing communication between the developing chamber 42 and the stirring chamber 43 on each of opposite end sides with respect to a longitudinal direction (rotational axis direction of the developing roller 50 and the supplying roller 51). The developer accommodating portion 40*a* forms a circulation passage along which the developer is circulated between the developing chamber 42 and the stirring chamber 43 via the opening provided in the partition wall 41.

In this embodiment, the partition wall 41 is provided at a substantially central portion in the developer accommodating portion 40*a*. By this, the developer accommodating portion 40*a* is partitioned by the partition wall 41 so that the developing chamber 42 and the stirring chamber 43 are adjacent to each other in the horizontal direction. In the developing chamber 42 and the stirring chamber 43, a first conveying screw 44 and a second conveying screw 45 which are rotatable are provided, respectively, for stirring and circulating the developer.

The first conveying screw 44 as a first feeding member is disposed opposed substantially parallel to the supplying roller 51 along the rotational axis direction (longitudinal direction) of the supplying roller 51 at a bottom in the developing chamber 42 (in the first chamber). The first conveying screw 44 includes a rotation shaft 44*a* and a blade 44*b* provided helically at a periphery of the rotation shaft 44*a*. The second conveying screw 45 as a second feeding member is disposed substantially parallel to the first conveying screw 44 at a bottom in the stirring chamber 43 (in the second chamber). The second conveying screw 45 includes a rotation shaft 45*a* and a blade 45*b* provided helically at a periphery of the rotation shaft 45*a*.

The first conveying screw 44 and the second conveying screw 45 are rotated in an arrow R4 direction and an arrow R3 direction, respectively, so that the developer is fed in the developing chamber 42 and the stirring chamber 43, respectively. The developer fed by rotation of the first conveying screw 44 and the second conveying screw 45 is circulated between the developing chamber 42 and the stirring chamber 43 through the opening at each of opposite end portions of the partition wall 41. The toner is stirred by the first conveying screw 44 and the second conveying screw 45, whereby the toner is triboelectrically charged to a negative polarity or a positive polarity by friction with the carrier.

As shown in FIG. 2, the developing roller 50 and the supplying roller 51 are disposed above the developing chamber 42 and the stirring chamber 43 with respect to a vertical direction in the inside of the housing 70. The developing roller 50 is provided obliquely on the supplying roller 51 between the supplying roller 51 and the photosensitive drum 1 as viewed in the rotational axis direction of the supplying roller 51. That is, the developing roller 50 is disposed so that the rotational axis thereof is positioned above the rotational axis of the supplying roller 51. The supplying roller 51 and the developing roller 50 are disposed opposed to each other in a closest position P1 with the rotational axes thereof substantially parallel to each other. The closest position P1 is a position where the supplying roller 51 and the developing roller 50 oppose each other on a line connecting rotation centers of the supplying roller 51 and the developing roller 50.

The developing roller 50 opposes the photosensitive drum 1 on an opening 72 side of the housing 70. Each of the developing roller 50 and the supplying roller 51 is provided rotatably about the rotational axis thereof. Each of the developing roller 50 and the supplying roller 51 is rotationally driven in a counterclockwise direction (arrow R6 direction or arrow R5 direction) in FIG. 2. That is, the developing roller 50 and the supplying roller 51 are rotated in the directions opposite to each other (opposite directions) in the closest position P1, and rotational speeds thereof are made variable by the driving portion 9.

The supplying roller 51 is a non-magnetic cylindrical roller rotatable in the counterclockwise direction in FIG. 2, and is provided rotatably at a periphery of a non-rotational cylindrical magnet roller 51*a* which is provided on an inner peripheral side and which is a magnetic field generating means and a second magnet. That is, the magnet roller 51*a* is non-rotationally fixed and disposed inside the supplying roller 51. The magnet roller 51*a* includes 5 pieces, and 5 magnetic poles are arranged sequentially in the rotational direction of the supplying roller 51. Incidentally, in this embodiment, the magnet roller having the 5 poles is used, but may be a magnet roller having poles other than the 5 poles, and for example, a magnet roller having 7 poles may also be used.

The supplying roller 51 carries the developer containing the non-magnetic toner and the magnetic carrier and rotationally conveys the developer to the closest position P1 to the developing roller 50. That is, the supplying roller 51 is disposed opposed to the developing roller 50 and supplies the developer inside the developer accommodating portion 40*a* (inside the developing container) to the developing roller 50.

The regulating blade 52 as a regulating member is disposed upstream, with respect to the rotational direction of the supplying roller 51, of a position (closest position P1) where the supplying roller 51 opposes the developing roller 50, and regulates an amount of the developer carried on the supplying roller 51. That is, the regulating blade 52 is a plate-like member and is provided in the developing container 40 so that a free end thereof opposes the outer peripheral surface of the supplying roller 51 in which a regulating pole is one of the magnetic poles of the magnet roller 51*a*. A predetermined gap is provided between the free end of the regulating blade 52 and an outer peripheral surface of the supplying roller 51. Further, a magnetic chain of the developer carried on the surface of the supplying roller 51 is cut by the regulating blade 52, so that a layer thickness of the developer is regulated.

The developing roller 50 is disposed opposed to the photosensitive drum 1 and conveys the developer to a developing position where the electrostatic latent image formed on the photosensitive drum 1 is developed by rotation of the developing roller 50. That is, the developing roller 50 is a non-magnet roller rotatable in the counter-clockwise direction in FIG. 2 and is provided rotatably around the magnet roller 50*a* as a first magnet which includes a receiving pole which is a single magnetic pole provided on an inner peripheral surface side and which does not rotate. The developing roller 50 is capable of developing the electrostatic latent image on the photosensitive drum 1 in a developing region P2 which is an opposing region to the photosensitive drum 1 by being rotated while carrying the toner. The supplying roller 51 and the developing roller 50 oppose each other in the closest position P1 therebetween with a predetermined gap. The receiving pole S4 of the magnet roller 50*a* of the developing roller 50 is different in polarity from the main pole which is one of the magnetic poles of the magnet roller 51*a* and which opposes the receiving pole by way of the supplying roller 51 and the developing roller 50.

To the supplying roller 51, a supplying bias in the form of a superimposition of a DC voltage and an AC voltage is applied. Further, also to the developing roller 50, a developing bias in the form of superimposition of a DC voltage and an AC voltage is applied. The developing bias and the supplying bias are applied from a bias power source 54 as an example of a voltage applying portion, to the developing roller 50 and the supplying roller 51, respectively, through a bias control circuit.

That is, the bias power source 54 applies a voltage including a DC component and an AC component to between the developing roller 50 and the supplying roller 51. By a potential difference between the voltage applied to the supplying roller 51 and the voltage applied to the developing roller 50, the toner is supplied from the supplying roller 51 to the developing roller 50, and in addition, by an effect of the AC component, the toner on the developing roller 50 after the development is collected by the supplying roller 51.

As described above, by repeating delivery between the supplying roller 51 and the developing roller 50, floating toner is liable to stagnate in the neighborhood of the closest position P1 between the supplying roller 51 and the developing roller 50. In general, in a space S between the supplying roller 51, the developing roller 50, and the wall portion 71, a flow of air is generated by rotation of the supplying roller 51 and rotation of the developing roller 50. Accordingly, pressure inside the housing 70 becomes higher than pressure outside the housing 70. As a result, in the space S, there is a possibility that toner which is separated from the developing roller 50 by a magnetic brush without being used in the development and the above-described floating toner in the neighborhood of the closest position P1 scatter to the outside of the developing device 4 through the opening 72 of the housing 70.

[Shielding Roller]

As a countermeasure to such scattering, in this embodiment, a shielding roller 53 as a rotatable member and a shielding member is provided in a position, opposing the supplying roller 51, between the wall portion 71 and the developing roller 50 and downstream of the closest position P1 between the developing roller 50 and the supplying roller 51 with respect to a rotational direction of the supplying roller 51. The shielding roller 53 is disposed substantially opposed to both the developing roller 50 and the supplying roller 51. Further, the shielding roller 53 is disposed in a position closer to the developing roller 50 than to the supplying roller 51. That is, a shortest distance between the shielding roller 53 and the developing roller 50 is shorter than a shortest distance between the shielding roller 53 and the supplying roller 51. Specifically, the shielding roller 53 is disposed in a position above the supplying roller 51 and close to the developing roller 50. By disposing the shielding roller 53, it is possible to suppress the scattering of the toner passing through between the wall portion 71 and the developing roller 50 toward the outside of the developing device through the opening 72.

The shielding roller 53 is constituted so as to be rotatable as described later, but an outer peripheral surface thereof is a cylindrical surface with a rotational axis as a center. That is, the shielding roller 53 may preferably be formed in a cylindrical shape or a columnar shape. A constitution in which a toner shielding member corresponding to the shielding roller 53 is formed so that the outer peripheral surface thereof becomes the cylindrical surface such as a rectangular parallelopiped shape such that an outer peripheral surface thereof has a corner, may be employed. However, compared with such a shape, when the shielding roller 53 is formed in the cylindrical shape or the columnar shape, warpage does not readily generate, so that it is possible to manufacture the shielding roller 53 with high accuracy. In this embodiment, the shielding roller 53 is formed in the cylindrical shape, and a diameter of the shielding roller 53 is 4 mm or more, for example.

The shielding roller 53 is rotatably supported by the housing 70. Further, the shielding roller 53 is a weak magnetic or non-magnetic metal member, and in the case where the shielding roller 53 is the weak magnetic metal member, the shielding roller 53 may preferably be made of a stainless steel of an austenitic type. Further, the shielding roller 53 comprises an electroconductive (conductive) material.

Here, as described above, only by providing the space enclosed by the developing roller 50, the supplying roller 51, and the wall portion 71, flowing of the toner cannot be blocked completely, so that the toner leaked out through the gap scatters to the outside. Further, the toner is deposited on the shielding roller 53, so that a so-called drop (dropping) such that the deposited toner stagnates and drops is generated, so that the drop may have the influence on the image. Particularly, in the case where the shielding roller 53 is disposed above the supplying roller 51 as in this embodiment, the dropped toner drops onto the supplying roller 51, and therefore, there is a liability that an image defected such that a toner concentration at a portion where the toner is dropped on the supplying roller 51 becomes high and thus an image density of the toner image formed on the photosensitive drum 1 becomes high occurs. This is also similar to the case where the shielding roller 53 is disposed above the developing roller 50 although different from this embodiment.

Therefore, in this embodiment, when the supplying roller 51 and the developing roller 50 are driven, a DC voltage which has the same polarity as a normal charge polarity of the toner and which is equal in absolute value to a DC voltage applied to the supplying roller 51 is applied. That is, to the shielding roller 53, a voltage of the same potential as the voltage applied to the supplying roller 51 is applied. By making such a setting, by a potential difference, the toner is pressed from the shielding roller 53 to the developing roller 50. As a result, it is possible to suppress that the toner leaks out from the gap and scatters to the outside. Further, it is possible to suppress that the toner is deposited on the surface of the shielding roller 53 and leads to the drop thereof.

However, only by setting the potential as described above, it is difficult to catch the toner between the shielding roller 53 and the supplying roller 51 in an electric field manner.

Figure 3:
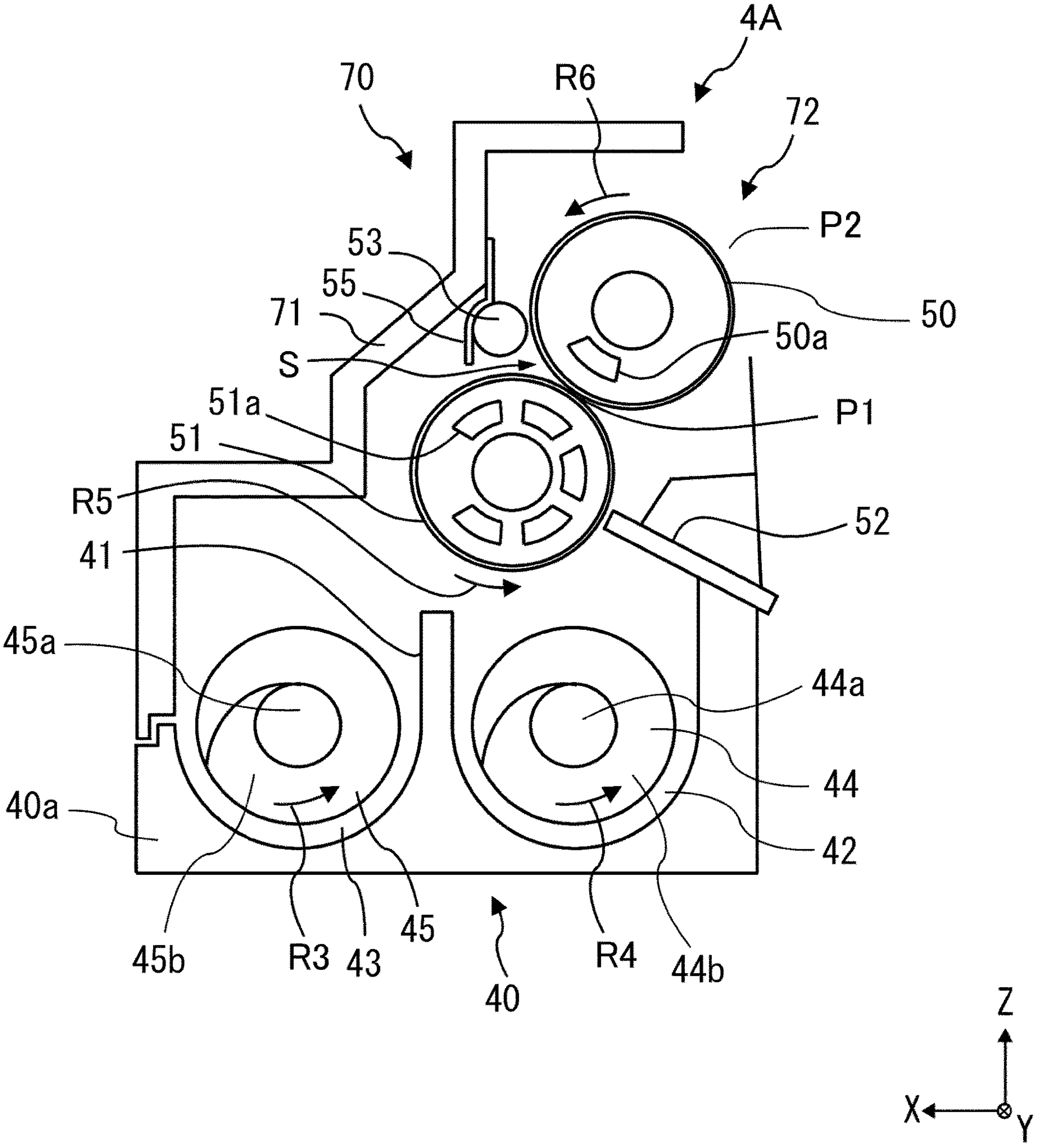
FIG. 3 is a schematic structural sectional view of a developing device according to a comparison example.

As a constitution in which such toner scattering is suppressed, as in a developing device 4A in a comparison example shown in FIG. 3, it would be considered that the gap is closed by providing a toner shielding member 55 in a seal shape between the wall portion 71 and the shielding roller 53. However, in this constitution, there is a possibility that the pressure inside the housing 70 increases and the floating toner in the neighborhood of the space S scatters to the outside of a developing device 60 from a gap between the shielding roller 53 and the developing roller 50 or a gap between the developing roller 50 and the supplying roller 51.

Therefore, in this embodiment, the shielding roller 53 is rotated in a rotational direction R7 and the air is drawn from between the wall portion 71 and the shielding roller 53, so that the air is blown out while shielding the toner by an electric field generated between the developing roller 50 and the shielding roller 53. By this, the toner scattering can be suppressed while suppressing an increase in pressure inside the housing 70.

[Driving Constitution of Developing Device]

Next, a drive constitution of the developing device 4 according to this embodiment will be described using FIGS. 4 and 5. In this embodiment, the shielding roller 53 is rotatable in a forward direction to the rotational direction R6 of the developing roller 50 by gear constitutions 90 and 91. That is, the rotational direction of the shielding roller 53 is the same direction as the rotational direction of the developing roller 50.

Figure 4:
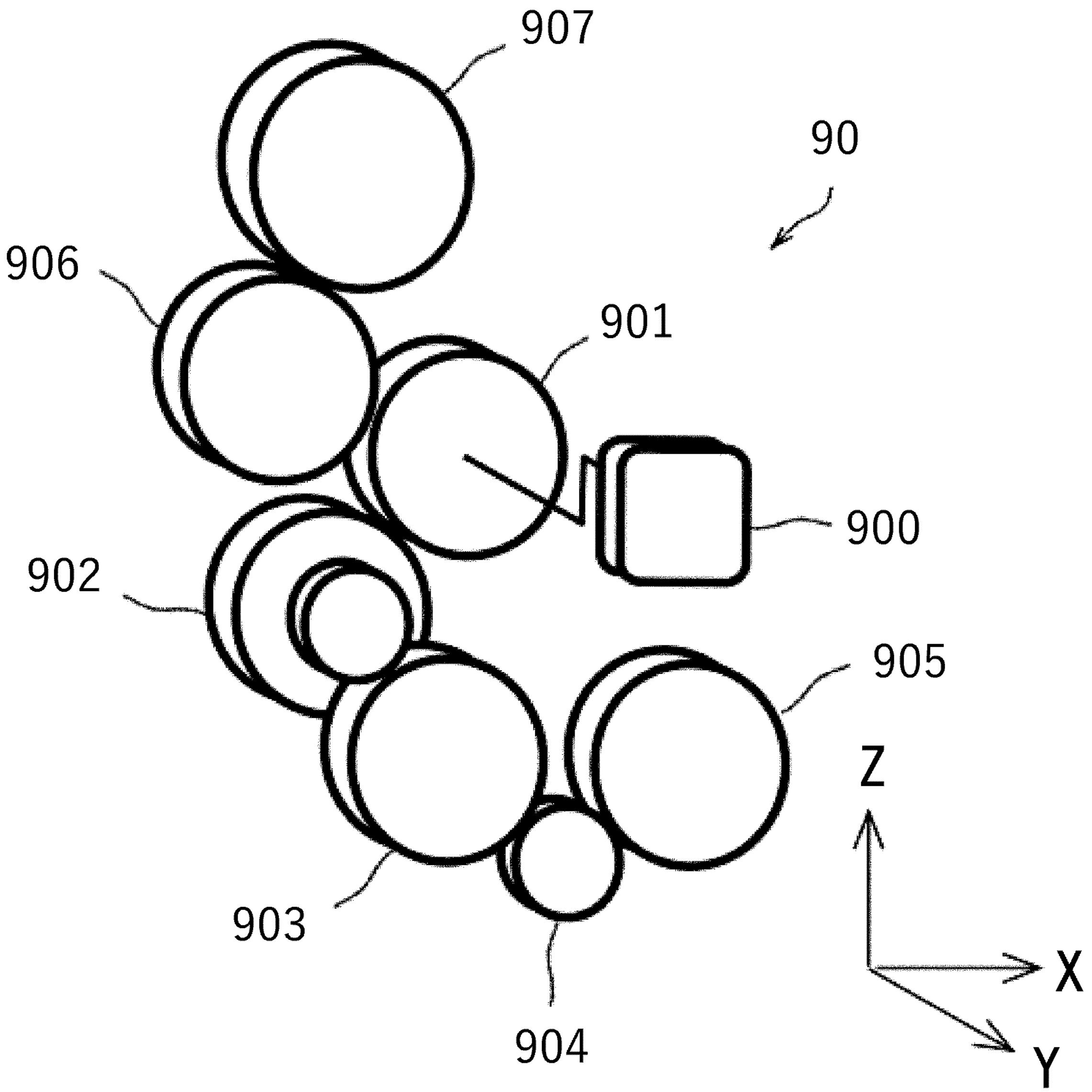
FIG. 4 is a schematic view showing a drive constitution of the image forming apparatus of the first embodiment on a rear side.

Here, the gear constitution 90 shown in FIG. 4 shows a drive constitution on a device rear side and shows a state of the gear constitution 90 as viewed from the device rear side. The gear constitution 91 shown in FIG. 5 shows a drive constitution on the device rear side and shows a state of the gear constitution 91 as viewed from a device front side. Incidentally, the device front side is a front side of the image forming apparatus 100, and is, for example, a side (the front side of the drawing sheet in FIGS. 1 and 2) where an operating portion for receiving an operation of an operator. The device rear side is an opposite side (the rear side of the drawing sheet in FIGS. 1 and 2) to the device front side.

As shown in FIG. 4, in this embodiment, at the device rear side of the developing device 4, a driving motor 900 as a driving source is provided. The driving motor 900 is directly connected to a gear 901 of the gear constitution 90. The gear 901 is provided at one end portion (end portion on the device rear side) of the supplying roller 51. Further, gears 907, 903, and 905 are provided at one end portions of the developing roller 50, the first conveying screw 44, and the second conveying screw 45, respectively.

An operation of the gear constitution 90 will be described while making reference to FIG. 2. During image formation, the gear 901 is driven by the driving motor 900, so that the supplying roller 51 provided with the gear 901 is rotated in the rotational direction R5. Under the gear 901, an idler gear 902 is provided adjacent to the gear 901 and is rotated with rotation of the gear 901. Further, the gear 903 is provided adjacent to the idler gear 902, and rotation of the gear 901 is transmitted to the gear 903 by way of the idler gear 902, so that the first conveying screw 44 provided with the gear 903 is rotated in the rotational direction R4. Further, rotation of the gear 903 is transmitted to the gear 905 by way of an idler gear 904, so that the second conveying screw 45 provided with the gear 905 is rotated in the rotational direction R3.

On the other hand, on the gear 901, an idler gear 906 is provided adjacent to the gear 901, so that the idler gear 906 is rotated with the rotation of the gear 901. Further, the gear 907 is provided adjacent to the idler gear 906 and the rotation of the gear 901 is transmitted to the gear 907 by way of the idler gear 906, so that the developing roller 50 provided with the gear 907 is rotated in the rotational direction R6.

Figure 5:
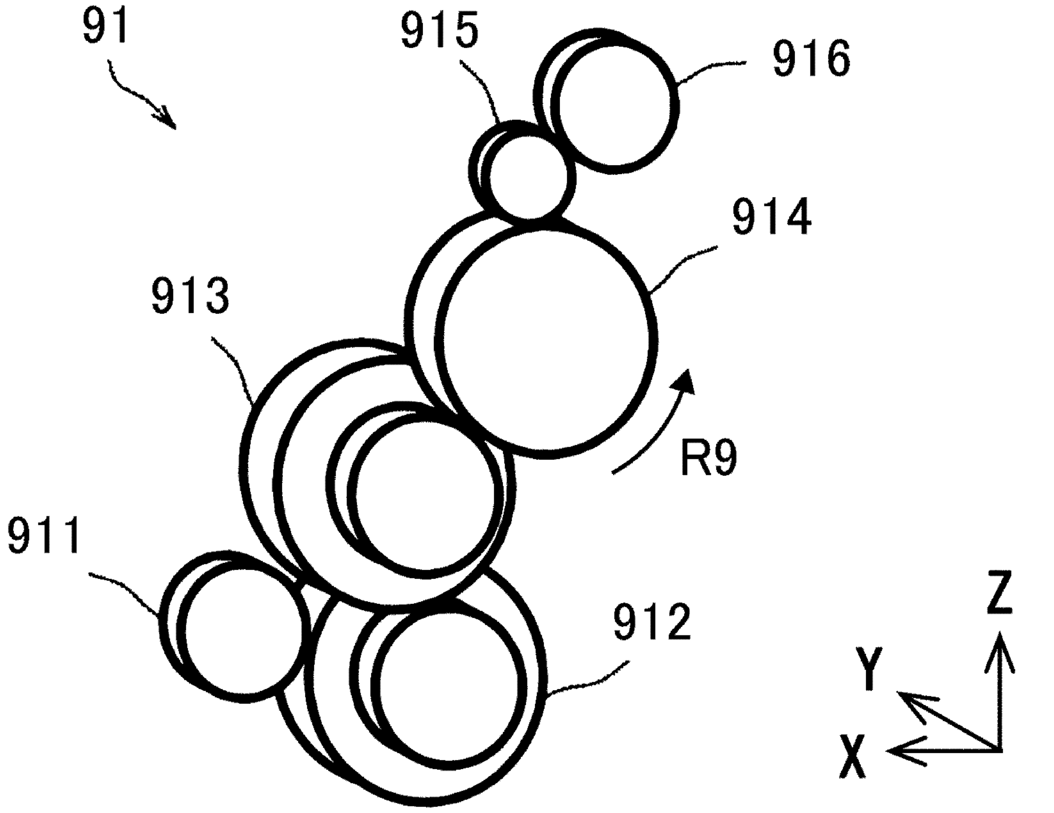
FIG. 5 is a schematic view showing a drive constitution of the image forming apparatus of the first embodiment on a front side.

As shown in FIG. 5, the other end portion (end portion on the device front side) of the second conveying screw 45 is provided with a gear 911. Further, a gear 916 is provided at the other end portion of the shielding roller 53. Between the gears 911 and 916, a plurality of idler gears 912 and 915 are provided. When rotation is transmitted to the gear 905 in FIG. 4, the gear 905 is provided at the above-described one end portion of the second conveying screw 45, and therefore, the gear 911 provided at the other end portion of the second conveying screw 45 is rotated. Then, with rotation of the gear 911, the idler gear 914 adjacent to the idler gear 913 is rotated in a rotational direction R9 by way of the idler gear 912 adjacent to the gear 911 and the idler gear 913 adjacent to the idler gear 912. Further, with the rotation of the idler gear 914, the gear 916 is rotated by way of the idler gear 915 adjacent to the idler gear 914, so that the shielding roller 53 provided with the gear 916 is rotated in a rotational direction R7.

A peripheral speed of the shielding roller 53 may preferably be 1/20 or more and 1/1 or less, more preferably be 1/10 or more and 3/20 or less, a peripheral speed of the supplying roller 51. In the case where the peripheral speed of the shielding roller 53 is less than 1/20 of the peripheral speed of the supplying roller 51, a sufficient air flow does not generate between the wall portion 71 and the shielding roller 53 by rotation of the shielding roller 53, so that there is a liability that the air cannot drain. Further, when the peripheral speed of the shielding roller 53 exceeds 1/1 of the peripheral speed of the supplying roller 51, the air drawn from between the wall portion 71 and the shielding roller 53 is carried to between the shielding roller 53 and the supplying roller 51, so that there is a liability that the toner is liable to stagnate in the space S.

Accordingly, the peripheral speed of the shielding roller 53 to the peripheral speed of the supplying roller 51 is made 1/20 or more and 1/1 or less, preferably 1/10 or more and 3/20 or less, so that the air can be discharged to the outside while causing the toner to be hard to stagnate in the space S, and thus an increase in pressure of the inside of the developing device 4.

In the case of this embodiment described above, a constitution in which the shielding roller 53 is rotated is employed, and therefore, the air is drawn from between the wall portion 71 and the shielding roller 53 and is then discharged.

By this, the toner scattering can be suppressed while suppressing the increase in pressure of the inside of the developing device 4. As a result, it is possible to suppress that the inside of the image forming apparatus 100 is contaminated with the scattered toner.

Further, to the shielding roller 53, a DC voltage which has the same polarity as the normal charge polarity of the toner and which is equal in absolute value to a DC voltage applied to the supplying roller 51 is applied, and therefore, the toner is shielded by an electric field generating between the developing roller 50 and the shielding roller 53, so that it is possible to suppress that the toner is leaked out from a gap and then is scattered to the outside of the developing device 4. In addition, by applying such a voltage to the shielding roller 53, the toner is pressed from the shielding roller 53 to the developing roller 50, so that it is possible to suppress that the toner is deposited on the surface of the shielding roller 53 and then leads to drop thereof. As a result, an occurrence of an image defect due to the drop of the toner can be suppressed.

Second Embodiment

Figure 6:
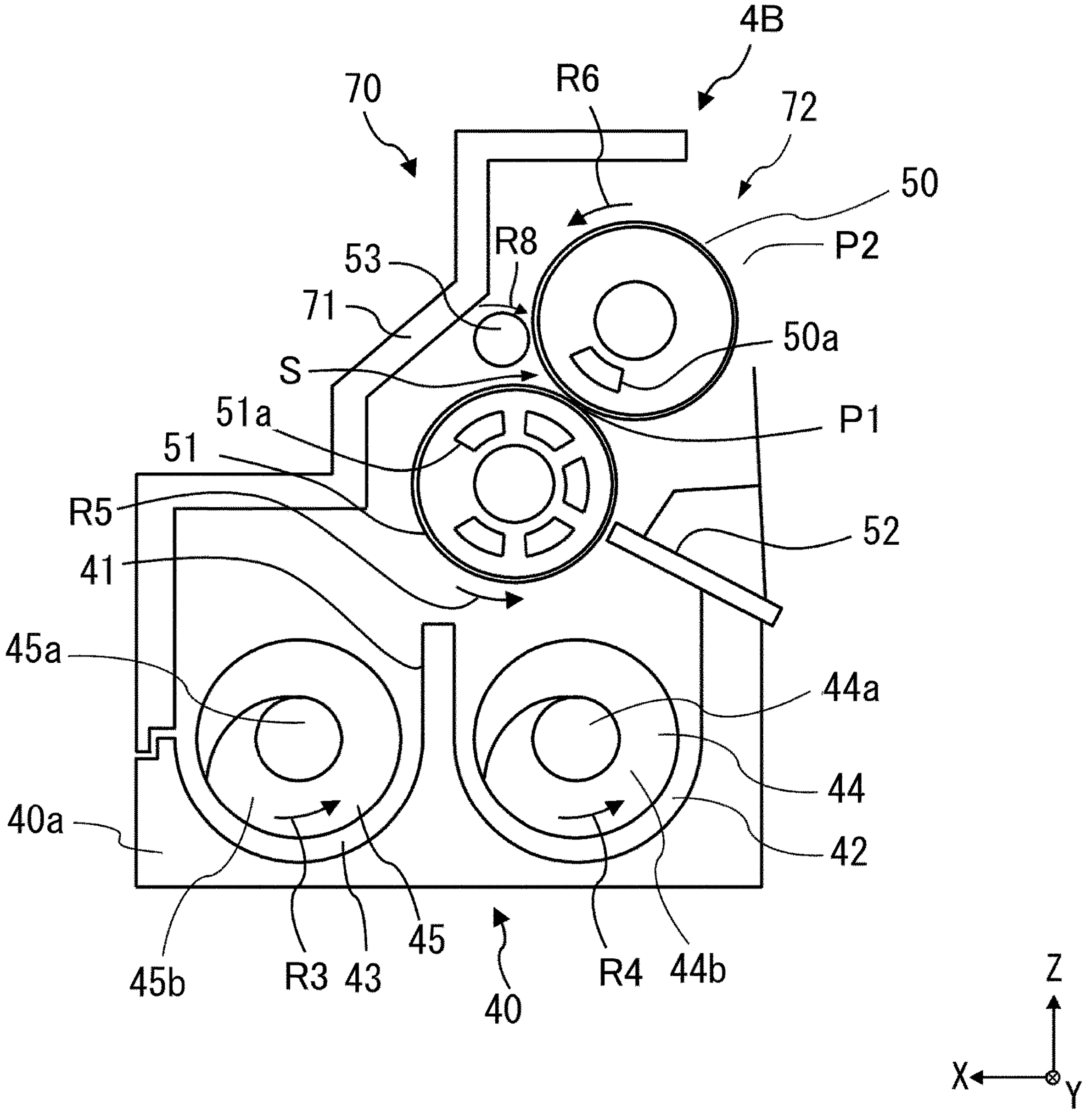
FIG. 6 is a schematic structural sectional view of a developing device according to a second embodiment.

A second embodiment will be described using FIGS. 6 and 7. This embodiment is different in rotational direction of the shielding roller 53 from the first embodiment. Other constitutions and actions are similar to those in the first embodiment, and therefore, the similar constitutions are omitted from description and illustration or briefly described by adding the same reference numerals or symbols, and in the following, a difference from the first embodiment will be principally described.

In the first embodiment, the shielding roller 53 was made rotatable in the forward direction with respect to the rotational direction of the supplying roller 51. On the other hand, in a developing device 4B in this embodiment, as shown in FIG. 6, the shielding roller 53 is made rotatable in a rotational direction R8 which is an opposite direction to the rotational direction R6 of the developing roller 50. That is, the rotational direction of the shielding roller 53 is an opposite direction to the rotational direction of the developing roller 50.

Figure 7:
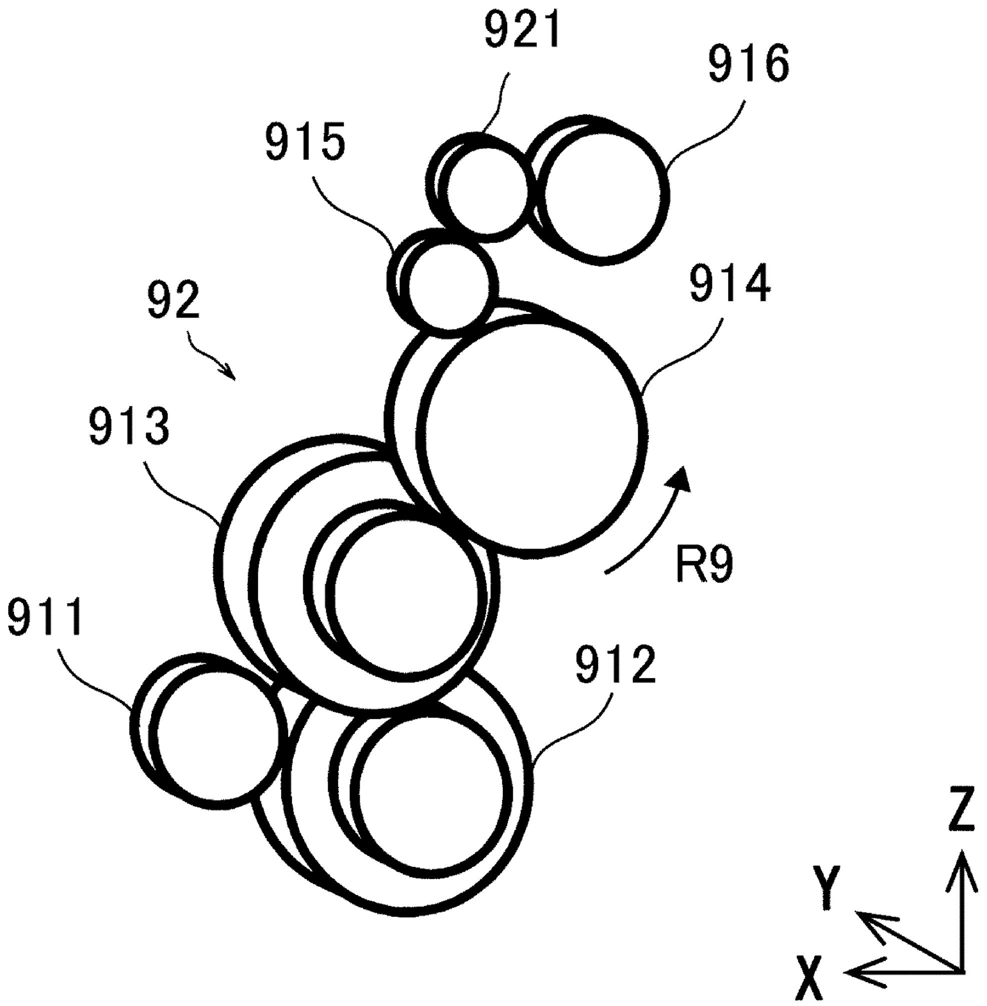
FIG. 7 is a schematic view showing a drive constitution of an image forming apparatus according to the second embodiment.

A gear constitution 92 shown in FIG. 7 shows a drive constitution on the device front side and shows a state as viewed from the device front side. In this embodiment, the gear constitution 90 on the device rear side is similar to FIG. 4 shown in the first embodiment, but the gear constitution 92 on the device front side is different from the gear constitution 91 in the first embodiment. That is, as shown in FIG. 7, in the gear constitution 92 in this embodiment, compared with the gear constitution 91 in the first embodiment, the idler gear 915 and the gear 916 are not made adjacent to each other, but an idler gear 921 is added in the form such that the idler gear 921 is adjacent to both the idler gear 915 and the gear 916. By this, the shielding roller 53 provided with the gear 916 is rotated in a rotational direction R8 as shown in FIG. 6. The rotational direction R8 is opposite to the rotational direction R6 of the developing roller 50.

Incidentally, as regards the first and second embodiments, the first embodiment is preferred to the second embodiment. This is because, in the second embodiment, in the case where the toner is deposited on the shielding roller 53, there is a liability that the deposited toner is shaken down and is deposited on the developing roller 50, and thus causes an image defect such as a stain. In addition, the floating toner is liable to stagnate in the space S, and in the case where the shielding roller 53 is rotated in the rotational direction R8, the air stream generates in a direction toward the space S from the gap between the shielding roller 53 and the developing roller 50, so that there is a liability that the pressure in the neighborhood of the space S increases and leads to the toner scattering.

However, even in the case of this embodiment, the shielding roller 53 is rotated, and therefore, the air is drawn from between the wall portion 71 and the shielding roller 53 and thus can be discharged. For this reason, the toner scattering can be suppressed while suppressing the increase in pressure of the inside of the developing device 4 than in the case where the shielding roller 53 is not rotated.

Third Embodiment

A third embodiment will be described using FIG. 8. This embodiment is different in constitution of a shielding roller 53A from the first embodiment. Other constitutions and actions are similar to those in the first and second embodiments, and therefore, the similar constitutions are omitted from description and illustration or briefly described by adding the same reference numerals or symbols, and in the following, a difference from the first embodiment will be principally described.

Part (a) of FIG. 8 is a schematic perspective view of the shielding roller 53A according to this embodiment. Part (b) of FIG. 8 is a schematic view of the shielding roller 53A in which a part of a surface of the shielding roller 53A is enlarged and is linearly developed. An arrow h in these figures shows a rotational direction of the shielding roller 53A with a rotational axis j as a center in part (a) of FIG. 8. As shown in part (a) of FIG. 8, a plurality of groove portions 531 formed along a longitudinal direction are provided over a full circumference of an outer peripheral surface of the shielding roller 53A. That is, the shielding roller 53A is provided with the plurality of groove portions 531 with respect to the longitudinal direction of the surface thereof for the surface shape of the shielding roller 53 described in the first embodiment.

The plurality of groove portions 531 are, as shown in part (a) of FIG. 8, formed regularly over the full circumference of the shielding roller 53A. A depth the groove portions 531 formed on the surface of the shielding roller 53A is, for example, 50 μm or more. Further, a number of the groove portions 531 formed on the surface of the shielding roller 53A is, for example, 20 or more.

Thus, the shielding roller 53A is provided with the groove portions 531 on the surface thereof, whereby generation of the air stream by rotation of the shielding roller 53A is promoted, and thus the toner scattering to the outside of the developing device can be suppressed. Incidentally, numerical values, dimensions, and the like of the above-described groove shape are examples, and are not particularly limited. Further, a constitution of this embodiment may be applied to the second embodiment. That is, a constitution in which the shielding roller 53A is rotated in the rotational direction R8 shown in FIG. 7.

Fourth Embodiment

A fourth embodiment will be described. This embodiment is different in voltage applied to a shielding roller 53 from the first embodiment. Other constitutions and actions are similar to those in the first embodiment, and therefore, the similar constitutions are omitted from description and illustration or briefly described by adding the same reference numerals or symbols, and in the following, a difference from the first embodiment will be principally described.

In the above-described first embodiment, the bias of the same potential was applied to the shielding roller 53 and the supplying roller 51. On the other hand, in this embodiment, an absolute value of a DC component of a voltage applied to the shielding roller 53 is larger than an absolute value of a DC component of a voltage applied to the supplying roller 50. That is, a bias with a DC component Vdc2 which has the same polarity as the toner and which includes a DC component Vdc2 larger in absolute value than a DC component Vdc1 of a bias applied to the supplying roller 51.

By setting the biases as in this embodiment, due to a potential difference, the toner is pressed from the shielding roller 53 toward a direction of the supplying roller 51. As a result, it is possible to suppress that the toner is deposited on the surface of the shielding roller 53 and then leads to drop thereof. Incidentally, the potential difference between Vdc1 and Vdc2 is 400 V in this embodiment. Further, relationships between the biases in this embodiment may also be applied to the second and third embodiments.

Fifth Embodiment

A fifth embodiment will be described using FIG. 9. In the above-described embodiments, a so-called touch-down type developing device including the developing roller and the supplying roller was described. On the other hand, a developing device 4C in this embodiment employs a constitution including only a developing roller 50A. Other constitutions and actions are similar to those in the first embodiment, and therefore, the similar constitutions are omitted from description and illustration or briefly described by adding the same reference numerals or symbols, and in the following, a difference from the first embodiment will be principally described.

As in the developing device 4C in this embodiment, by employing a constitution in which only the developing roller 50A is included and in which the shielding roller 53 is rotated, an effect similar to the effect of the first embodiment is obtained. The developing device 4C in this embodiment includes a developing container 40A, the developing roller 50A as the rotatable developing member, and the shielding roller 53 as the rotatable member. The developing container 40A includes a housing 70A and a developer accommodating portion 40Aa provided at a lower portion of the housing 70A. The housing 70A includes a wall portion 71A and an opening 72A.

The wall portion 71A is provided in a position opposing a part of the developing roller 50A. In the case of this embodiment, the wall portion 71A is positioned on a side opposite from the regulating blade 52 while sandwiching the developing roller 50A therebetween. In this position, the wall portion 71A is disposed along an outer peripheral surface of the developing roller 50A.

The opening 72A is formed in a position where the developing container 40A opposes the photosensitive drum 1, so that the developing roller 50A opposes the photosensitive drum 1 by way of the opening 72A.

In the developer accommodating portion 40Aa, a developer containing non-magnetic toner and a magnetic carrier is accommodated. At a substantially, central portion in the developer accommodating portion 40Aa, the partition wall 41 is provided. By this, the developer accommodating portion 40*a* is partitioned by the partition wall 41 so that the developing chamber 42 and the stirring chamber 43 are adjacent to each other in the horizontal direction. In the developing chamber 42 and the stirring chamber 43, the first conveying screw 44 and the second conveying screw 45 which are rotatable for stirring and circulating the developer are disposed, respectively. A constitution in which the developer is circulated inside the developer accommodating portion 40Aa is roughly similar to that in the first embodiment.

The developing roller 50A is disposed opposed to the photosensitive drum 1 and is rotated, and thus conveys the developer to the developing position where the electrostatic latent image formed on the photosensitive drum 1 is developed. That is, the developing roller 50A is rotated, and thus carries and conveys the developer in the developer accommodating portion 40*a* (in the developing container) and supplies the developer to the photosensitive drum 1. The regulating blade 52 is disposed upstream of the developing position with respect to the rotational direction of the developing roller 50A and regulates an amount of the developer carried on the developing roller 50A.

In such a developing device 4C, toner floating between a left side of the developing roller 50A in FIG. 9 and the wall portion 71A scatters to an outside of the developing device 4C in a flow passage toward the opening 72A. As a countermeasure to this toner scattering, a constitution in which a sheet is stuck to the wall portion 71A, opposing the developing roller 50A, in the neighborhood of the opening 72A and in which air stream to the outside of the developing device 4C through the opening 72A would be considered. However, there is a liability that the pressure inside the developing device 4C increases and thus the toner scatters from between the developing roller 50A and the regulating blade 52.

Therefore, in this embodiment, between an upper-left portion of the developing roller 50A in FIG. 9 and the wall portion 71A, the shielding roller 53 is rotatably provided, and is rotated in a rotational direction R10. The rotational direction of the shielding roller 53 and the rotational direction of the developing roller 51 are the same. By rotating the shielding roller 53 in the rotational direction R10, between the wall portion 71A and the shielding roller 53, the air stream generates in a direction in which the air is drawn toward the inside of the developing device 4C, so that the toner scattering to the outside of the developing device 4C through the opening 72A can be suppressed.

Further, in this embodiment, similar to the relationship between the supplying roller 51 and the shielding roller 53 in the first embodiment, the developing roller 50A and the shielding roller 53 may be made the same in potential, and even in this case, the scattering and the drop of the toner can be suppressed to some extent. However, similar to a relationship between the supplying roller 51 and the shielding roller 53 in the fourth embodiment, it is preferable that a potential difference is provided between the developing roller 50A and the shielding roller 53. In this case, the scattering and the drop of the toner can be further suppressed.

Other Embodiments

In the above-described embodiments, the case where the present invention is applied to the developing device for use in the image forming apparatus of the tandem type was described. However, the present invention is also applicable to the developing device for use in the image forming apparatus of another type. Further, the image forming apparatus is not limited to the image forming apparatus for a full-color image, but may also be an image forming apparatus for a monochromatic image or an image forming apparatus for a mono-color (single color) image. Or, the image forming apparatus can be carried out in various uses, such as printers, various printing machines, copying machines, facsimile machines and multi-function machines by adding necessary devices, equipment and casing structures or the like.

Further, also as regards the structure of the developing device, as described above, the structure is not limited to a structure in which the developing chamber and the stirring chamber are disposed in the horizontal direction, but may also be a structure in which the developing chamber and the stirring chamber are disposed in a direction inclined with respect to the horizontal direction. In summary, a constitution in which the developing chamber as the first chamber and the stirring chamber as the second chamber are disposed adjacent to each other so as to partially overlap with each other as viewed in the horizontal direction may only be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066246 filed on Apr. 14, 2023, which is hereby incorporated by reference herein in its entirety.

What is claimed is:

1. An image forming apparatus comprising:

an image bearing member;

a developing device including:

a developing container configured to accommodate a developer containing toner and a carrier, a developing roller configured to carry and convey the toner to a developing position where an electrostatic latent image formed on the image bearing member is developed with the toner, a supplying roller provided opposed to the developing roller and configured to supply only the toner to the developing roller while carrying and conveying the developer supplied from the developing container, the developing roller being rotated in a rotational direction opposite to a rotational direction of the supplying roller in a closest position where the supplying roller is positioned closest to the developing roller, a first magnet provided non-rotationally and fixedly inside the developing roller and including a first magnetic pole, and a second magnet provided non-rotationally and fixedly inside the supplying roller and including a second magnetic pole which is provided opposed to the first magnetic pole and which is different in polarity from the first magnetic pole;

a conductive roller arranged facing the supplying roller and the developing roller, downstream of the developing position and upstream of the closest position in the rotational direction of the developing roller, a shortest distance between the conductive roller and the developing roller being shorter than a shortest distance between the conductive roller and the supplying roller;

a driving source configured to drive each of the supplying roller, the developing roller, and the conductive roller; and a bias applying portion configured to apply a bias to each of the supplying roller, the developing roller, and the conductive roller, wherein during image formation, the bias is applied to each of the supplying roller, the developing roller, and the conductive roller in a state in which each of the supplying roller, the developing roller, and the conductive roller is rotationally driven, and wherein during the image formation, a polarity of a first potential obtained by subtracting a DC potential of the developing roller from a DC potential of the supplying roller is the same as a normal charge polarity of the toner, and a polarity of a second potential obtained by subtracting the DC potential of the developing roller from a DC potential of the conductive roller is the same as the normal charge polarity of the toner.

2. An image forming apparatus according to claim 1, wherein during the image formation, the DC potential of the conductive roller and the DC potential of the supplying roller are the same.

3. An image forming apparatus according to claim 1, wherein during the image formation, a polarity of a third potential obtained by subtracting the DC polarity of the supplying roller from the DC potential of the conductive roller is the same as the normal charge polarity of the toner.

4. An image forming apparatus according to claim 1, wherein during the image formation, to the supplying roller, a superimposed bias between a DC voltage and an AC voltage is applied, and to the developing roller, a superimposed bias between a DC voltage and an AC voltage is applied.

5. An image forming apparatus according to claim 1, wherein during the image formation, a peripheral speed of the conductive roller is $1/20$ or more and 1/1 or less of a peripheral speed of the supplying roller.

6. An image forming apparatus according to claim 1, wherein during the image formation, a peripheral speed of the conductive roller is $1/10$ or more and $3/20$ or less of a peripheral speed of the supplying roller.

7. An image forming apparatus according to claim 1, wherein in a position on the developing roller to which the conductive roller is closest, a rotational direction of the developing roller is the same as a rotational direction of the conductive roller.

8. An image forming apparatus according to claim 1, wherein in a position on the developing roller to which the conductive roller is closest, a rotational direction of the developing roller is opposite to a rotational direction of the conductive roller.

9. An image forming apparatus according to claim 1, wherein on an outer peripheral surface of the conductive roller, a plurality of groove portions are formed along a rotational axis direction of the conductive roller, and wherein the plurality of groove portions are formed over a whole circumference of the conductive roller.

10. An image forming apparatus according to claim 1, wherein the developing device further includes a first gear provided at an end portion of the supplying roller with respect to a rotational axis direction of the supplying roller, a second gear provided at an end portion of the developing roller with respect to a rotational axis direction of the developing roller, and a third gear provided at an end portion of the conductive roller with respect to a rotational axis direction of the conductive roller, and wherein the driving source is motor, and the supplying roller, the developing roller, and the conductive roller are rotationally driven with transmission of a driving force of the motor to the first gear, the second gear, and the third gear, respectively.

11. An image forming apparatus according to claim 10, wherein the motor is directly connected to the first gear.

12. An image forming apparatus according to claim 10, further comprising an operating portion configured to receive an operation of an operator, wherein with respect to a front-rear direction of the image forming apparatus, each of the motor, the first gear, and the second gear is provided on a side opposite from a side where the operating portion is provided, and the third gear is provided on the same side as the side where the operating portion is provided.

13. An image forming apparatus according to claim 10, wherein each of the motor, the first gear, and the second gear is provided on a rear side with respect to a front-rear direction of the image forming apparatus, and wherein the third gear is provided on a front side with respect to the front-rear direction of the image forming apparatus.

* * * * *